United States Patent
Pezzoni et al.

(10) Patent No.: US 6,549,668 B1
(45) Date of Patent: Apr. 15, 2003

(54) DETECTION OF A 3:2 PULLDOWN IN A MOTION ESTIMATION PHASE AND OPTIMIZED VIDEO COMPRESSION ENCODER

(75) Inventors: Luca Pezzoni, Cormano (IT); Emiliano Piccinelli, Monza (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/416,646

(22) Filed: Oct. 12, 1999

(30) Foreign Application Priority Data

Oct. 12, 1998 (EP) ............................................. 98830600

(51) Int. Cl.⁷ .................................................. G06K 9/36
(52) U.S. Cl. .................... 382/236; 382/232; 375/240.16
(58) Field of Search .............................. 382/236, 232; 386/46; 348/96, 558, 452; 375/240.16

(56) References Cited

U.S. PATENT DOCUMENTS 5,565,998 A  * 10/1996 Coombs et al. ............... 386/46
5,757,435 A     5/1998 Wells ........................... 348/441
5,929,916 A  *  7/1999 Legall et al. ................. 348/419
6,058,140 A  *  5/2000 Smolenski ............... 375/240.16

FOREIGN PATENT DOCUMENTS

EP    0 708 564 A2    10/1995    ............ H04N/7/24
EP    0 720 371 A2    12/1995    ............ H04N/7/24

* cited by examiner

*Primary Examiner*—Anh Hong Do
(74) *Attorney, Agent, or Firm*—Allen, Dyer, Doppelt, Milbrath & Gilchrist, P.A.; Lisa K. Jorgenson

(57) ABSTRACT

A method for compressing encoding data of a sequence of pictures is based on a motion estimation among the successive images to remove the temporal redundancy from the data. The method recognizes a 3:2 pulldown conversion of a series of photograms of a filmed sequence in a sequence of TV frames. The TV frames have a number greater than the number of the photograms by duplicating certain pictures in a certain order. The redundancy due to such picture duplications is eliminated.

11 Claims, 10 Drawing Sheets

DETECTION OF A 3:2 PULLDOWN IN A MOTION ESTIMATION PHASE AND OPTIMIZED VIDEO COMPRESSION ENCODER

FIELD OF THE INVENTION

The present invention relates to transmission of digitized pictures, and, more particularly, to a picture compression technique based on motion estimation algorithms, such as those implemented in MPEG2 video encoders.

BACKGROUND OF THE INVENTION

World TV standards differ from one another in picture size and the way pictures are transmitted, e.g., frame rate, frequency band, etc. Usually, a motion picture is recorded by a camera at 24 photograms/second. In order for the film to be transmitted with the PAL or SECAM system, which requires a speed of 25 pictures/second, the film is slightly accelerated. This results in minor sound and motion distortions which are not perceived by a TV viewer. However, when the film must be transmitted with the NTSC TV standard, which requires a frame rate of 30 pictures/second, such an acceleration might produce distortions that would be perceived by the TV viewer. In this case, it is necessary to implement a 3:2 pulldown technique which transforms a film recorded at 24 photograms/second to a TV sequence of 30 pictures/second.

As shown in FIG. 1, a motion picture is recorded by a common photogram, that is, each picture is acquired as a whole in one instant. In contrast, a television picture is acquired in two distinct instants. A first instant is acquisition of the even lines, which makes up the even semifield (top field) of the picture. A second instant is acquisition of the odd lines, which makes up the odd semifield (bottom field). The sum of these two semifields make up the whole picture, which is also referred to as a video frame. In view of the fact that some time passes between the acquisition of the first and second semifields, there may be relative movements among the objects focused by the video camera. Consequently, an object may occupy slightly different positions in the two fields.

Even a photogram may be divided in two fields. The two fields are the even lines forming the top field and the odd lines forming the bottom field. Since the picture is acquired in a single instant, the focused objects will occupy the same position in both fields. The 3:2 pulldown conversion method from 24 to 30 photograms/second includes transforming a sequence of 4 photograms of the film in a sequence of 5 TV frames through the duplication of some fields according to the scheme illustrated in FIG. 2. In FIG. 2, Top i and Bot i indicate the top field (even lines) and the bottom field (odd lines), respectively, of the photogram i, where i=1,2,3,4. This repetition of fields causes artifacts that do not disturb the TV viewer because the frames repeat themselves at 33 ms intervals.

Since the fundamental of picture compression methods is to reduce the amount of information that must be transmitted or recorded, the encoding of repetitive fields could be avoided by coding 5 pictures with the same number of bits that would be required by 4 pictures upon detecting whether the sequence contains a 3:2 pulldown transformation. Hence, it will be a function of the decoder (the receiving station) to reconstruct the sequence of 5 pictures according to the above described scheme. For the same quality of the pictures the compression ratio may be increased, or for the same number of bits available for coding the pictures it is possible to improve their quality.

A reliable detection of the 3:2 pulldown may also permit a further improvement of the coding quality for compression algorithms that use motion estimators based on the correlation of generated motion fields. However, the field repetition according to a 3:2 pulldown scheme may cause inconsistencies in the global motion of the pictures. When a field is repeated, the motion estimator senses this as a stop of the motion (even if fictitious) of the picture's objects, thus verifying the convergence process of the generated vectors.

A further beneficial consequence of the detection of the 3:2 pulldown is that its detection will render useless all the predictions permitted by the encoding method, e.g., field prediction, dual prime prediction and frame prediction, etc. Detection of the 3:2 pulldown is also an advantage for the methods that take into consideration the lack of movement among the picture fields, such as the frame prediction methods.

To detect the 3:2 pulldown, an analysis of the motion fields generated by the coding system for an acceptable motion estimation among the fields becomes essential. The basic concept of motion estimation is the following. A set of pixels of a field of a picture may be placed in a position of the subsequent picture obtained by translating the preceding one. These transpositions of objects may expose to the video camera parts that were not visible before, as well as changes of their shape, e.g., zooming.

The family of algorithms suitable to identify and associate these portions of images is generally referred to as motion estimation. Such an association permits calculation of a difference image. This removes the redundant temporal information making more effective the subsequent process of compression by discrete cosine transform (DCT), quantization and entropic coding.

Such a method is found in the MPEG2 standard. Systems of motion estimation as well as the architecture of the present invention are equally useful and are readily applicable to systems for manipulating digitized pictures operating according to a standard different from the MPEG2 standard. A typical block diagram of a video MPEG2 decoder is depicted in FIG. 3. Such a system is made up of the following functional blocks.

Field ordinator. This block is composed of one or several field memories outputting the fields in the coding order required by the MPEG standard. For example, if the input sequence is I B B P B B P etc., the output order will be I P B B P B B . . . .

The intra coded picture I is a field and/or a semifield containing temporal redundancy. The predicted-picture P is a field and/or semifield from which the temporal redundancy with respect to the preceding I or P (previously co-decoded) picture has been removed. The bidirectionally predicted picture B is a field and/or a semifield whose temporal redundancy with respect to the preceding I and subsequent P (or preceding P and successive P) picture field has been removed. In both cases, the I and P pictures must be considered as already co/decoded.

Each frame buffer in the format 4:2:0 occupies the following memory space:

| standard PAL | |
|---|---|
| 720 × 576 × 8 for the luminance (Y) = | 3,317,760 bits |
| 360 × 288 × 8 for the chrominance (U) = | 829,440 bits |
| 360 × 288 × 8 for the chrominance (V) = | 829,440 bits |
| total Y + U + V = | 4,976,640 bits |
| standard NTSC | |
| 720 × 480 × 8 for the luminance (Y) = | 2,764,800 bits |
| 360 × 240 × 8 for the chrominance (U) = | 691,200 bits |
| 360 × 240 × 8 for the chrominance (V) = | 691,200 bits |
| total Y + U + V = | 4,147,200 bits |

Motion Estimator. This block removes the temporal redundancy from the P and B pictures.

DCT. This block implements the cosine-discrete transform according to the MPEG-2 standard. The I picture and the error pictures P and B are divided in 8*8 blocks of pixels Y, U, V on which the DCT transform is performed.

Quantizer Q. An 8*8 block resulting from the DCT transform is divided by a quantizing matrix to reduce the magnitude of the DCT coefficients. The information associated to the highest frequencies, less visible to human sight, tends to be removed. The result is reordered and sent to the successive block.

Variable Length Coding (VLC). The codification words output from the quantizer tend to contain a large number of null coefficients, followed by non-null values. The null values preceding the first non-null value are counted and the count figure forms the first portion of a codification word. The second portion of which represents the non-null coefficient.

These paired values tend to assume values more probable than others. The most probable ones are coded with relatively short words (composed of 2, 3 or 4 bits) while the least probable are coded with longer words. Statistically, the number of output bits is less than when these methods are not implemented.

Multiplexer and Buffer. Data generated by the variable length coder, the quantizing matrices, the motion vectors and other syntactic elements are assembled for constructing the final syntax processed by the MPEG-2 standard. The resulting bitstream is stored in a memory buffer, the limit size of which is defined by the MPEG-2 standard and cannot be overfilled. The quantizer block Q supports such a limit by making the division of the DCT 8*8 blocks dependant on how far the memory buffer of the system is filled, and on the energy of the 8*8 source block taken upstream of the motion estimation and DCT transform process.

Inverse Variable Length Coding (I-VLC). The variable length coding functions specified above are executed in an inverse order.

Inverse Quantization (IQ). The words output by the I-VLC block are reordered in the 8*8 block structure, which is multiplied by the same quantizing matrix that was used for its preceding coding.

Inverse DCT (I-DCT). The DCT transform function is inverted and applied to the 8*8 block output by the inverse quantization process. This permits passing from the domain of spatial frequencies to the pixel domain.

Motion Compensation and Storage. At the output of the I-DCT block the following may alternatively be present. A decoded I picture (or semipicture) that must be stored in a respective memory buffer for removing the temporal redundancy with respect thereto from subsequent P and B pictures. A decoded prediction error picture (semipicture) P or B must be summed to the information removed previously during the motion estimation phase. In case of a P picture, such a resulting sum is stored in a dedicated memory buffer and is used during the motion estimation process for the successive P pictures and B pictures. These field memories are generally distinct from the field memories used for re-arranging the blocks.

Display Unit. This unit converts the pictures from the format 4:2:0 to the format 4:2:2 and generates the interlaced format for displaying the images. The arrangement of the functional blocks depicted in FIG. 4 is an architecture implementing the above-described MPEG-2 decoder shown in FIG. 2. A distinctive feature is in the fact that the field rearrangement block, the motion compensation and storage block for storing the already reconstructed P and I pictures, and the multiplexer and buffer block for storing the bitstream produced by the MPEG-2 coding are integrated in memory devices external to the integrated circuit of the decoder. These memory devices are accessed through a single interface managed by an integrated controller.

Moreover, the preprocessing block converts the received images from the format 4:2:2 to the format 4:2:0 by filtering and subsampling the chrominance components. The postprocessing block implements a reverse function during the decoding and displaying phase of the images. The coding process employs also a decoding step for generating the reference pictures to make operative the motion estimation. For example, the first I picture is coded, then decoded, stored and used for calculating the prediction error that will be used to code the subsequent P and B pictures.

The play-back process of the bit stream previously generated by the coding process uses only the inverse functional blocks (I-VLC, I-Q, I-DCT, etc.) and not the direct functional blocks. From this point of view, the coding and the decoding implemented for the subsequent displaying of the images are nonconcurrent processes within the integrated architecture. The scope of motion estimation algorithms is to predict pictures/semipictures in a sequence obtaining the composition of whole blocks of pixels, referred to as predictors, originating from preceding and or future pictures or semifields.

According to the MPEG-2 standard, there are three types of pictures (fields) or semifields. The intra coded picture I is a field and/or a semifield containing temporal redundancy. The predicted-picture P is a field and/or semifield from which the temporal redundancy with respect to the preceding I or P (previously co/decoded) has been removed. The bidirectionally predicted-picture B is a field and/or a semifield whose temporal redundancy with respect to the preceding I and subsequent P (or preceding P and successive P) has been removed. In both cases, the I and P pictures must be considered as already co/decoded.

The P field or semifield will now be discussed in greater detail. Two fields of a picture will now be considered: Q1 at the instant t and the subsequent field Q2 at the instant t+(kp)*T. The following discussion also applies to the semifields. T is the field period and kp a constant dependent on the number of B fields existing between the preceding I and the subsequent P (or between two P). The field period T is $\frac{1}{25}$ sec. for the PAL standard, and $\frac{1}{30}$ sec. for the NTCS standard. Q1 and Q2 are formed by luminance and chrominance components. It is assumed that the motion estimation is applied only to the most energetic and, therefore, richer of information component, such as the luminance components represented as a matrix of N lines and M columns. Q1 and Q2 are divided into portions called macroblocks, each of R lines and S columns.

The results of the divisions N/R and M/S must be two integer numbers, not necessarily equal to each other. Let Mb2 (i,j) be a macroblock defined as the reference macroblock belonging to the field Q2 and whose first pixel, in the top left part thereof, is at the intersection between the i-th line and the j-th column. The pair (i,j) is characterized in that i and j are integer multiples of R and S, respectively.

FIG. 5 shows how the reference macroblock is positioned on the Q2 picture while the horizontal dash line arrows indicate the scanning order used to identify the various macroblocks on Q1. MB2 (i,j) is projected on the Q1 field to obtain MB1 (i,j). A search window is defined on Q1 having its center at (i,j) and is composed of the macroblocks MBk[e,f], where k is the macroblock index. The k-th macroblock is identified by the coordinates (e,f), with e and f being an integer number, such that:

$$-p <= (e-i) <= +p - q <= (f-j) <= +q$$

Each of the macroblocks is a possible predictor of MB2 (i,j). The different motion estimation algorithms are different among them according to the way they are searched and selected inside the search window. The predictor that minimizes a certain cost function is chosen among the possible predictors.

This function may vary according to the motion estimation algorithm selected. For example, in the MPEG2 standard, the predictors that minimize the L1 norm with respect to the reference macroblock were searched. The norm is equal to the sum of absolute values of the differences among common pixels and belongs to MB2 (i,j) and MBk (e,f). Each sum contributes R*S values, with a result being referred to as distortion.

The predictor most similar to MB2 (i,j) is identified by the coordinates of the prevailing predictor following the motion estimation. The vector formed by the difference between the position of the prevailing predictor and MB2 (i,j) is the motion vector. The motion vector describes how MB2 (i,j) originates from a shift of a similar macroblock inside the preceding field.

The B field or semifield will now be discussed in greater detail. Three picture fields are considered: $QP_{n-1}$ at the instant t, $QBk_B$ at the instant $t+(k_B)*T$ and $QP_n$ at the instant $t+(k_p)*T$. The following discussion also applies to the semifields. The variables $k_p$ and $k_B$ are dependent on the number of B fields (or semifields) preventively selected. T is the field period. The field period is $\frac{1}{25}$ sec. for the PAL standard, and $\frac{1}{30}$ sec. for the NTSC standard. $QP_{-1}$, $QBk_B$ and $QP_n$ are formed by luminance and chrominance components. The motion estimation is applied only to the most energetic and, therefore, richer of the information components, such as the luminance components, representable as a matrix of N lines and M columns. $QP_{n-1}$, $QBk_B$ and $QP_n$ are divided in portions called macroblocks, each of R lines and S columns.

The results of the divisions N/R and M/S must be two integer numbers, not necessarily equal. MB2 (i,j) is a macroblock defined as the reference macroblock belonging to the field Q2 and whose first pixel, in the top left part thereof, is at the intersection between the i-th line and the j-th-column. The pair (i,j) is characterized by the fact that i and j are integer multiples of R and S, respectively. MB2 (i,j) is projected on the $fQP_{n-1}$ field to obtain MB1 (i,j), and is projected on the $QP_n$ field to obtain MB3 (i,j).

A search window is defined on $QP_{n-1}$ with its center at (i,j), and is composed of the macroblocks MB1k[e,f]. A similar search window is defined on $Qp_n$ whose dimension may also be different, or in any case predefined, and is composed of the macroblocks MB3k[e,f], where k is the macroblock index. The k-th macroblock on the $QP_{n-1}$ is identified by the coordinates (e,f), such that:

$$-p1 <= (e-i) <= +p1 - q1 <= (f-j) <= +q1$$

The k-th macroblock on the $QP_n$ field is identified by the coordinates (e,f) such that:

$$-p3 <= (e-i) <= +p3 - q3 <= (f-j) <= +q3$$

The indexes e and f are integer numbers. Each of the macroblocks is a predictor of MB2 (i,j). In this case, there are two types of predictors for MB2 (i,j). A first type is obtained from the field that temporarily precede the one containing the block to be estimated (I or P). This first type is referred to as a forward predictor. A second type is obtained from the field that temporarily follows the one containing the block to be estimated (I or P). This second type is referred to as a backward predictor.

Among the two sets of possible predictors, one backward and one forward predictor is selected to minimize a certain cost function of a hardware implementation. The predictors are selected depending on the type of motion estimation algorithm in use. This cost function may vary depending on the type of motion estimation selected. For example, in the MPEG2 standard the predictor that minimizes the L1 norm with respect to the reference macroblock is searched. Such a norm is equal to the sum of absolute values of the differences among common pixels, and belongs to MB2 (i,j) and MB1k(e,f) or MB3k(e,f). Each sum contributes R*S values. The result is called distortion.

Hence, a certain number of forward distortion values are obtained among which the lowest is chosen. This identifies a prevailing position $(e_f, f_f)$ in the field $QP_{n-1}$. Certain backward distortion values are also identified, among which the minimum value is chosen identifying a new prevailing position. $(e_b, f_b)$ on the $Qp_n$ field. Moreover, the distortion value between MB2 (i,j) and a theoretical macroblock obtained by linear interpolation of the two prevailing predictors is calculated. Therefore, MB2 (i,j) may be estimated using only three types of macroblocks. The forward predictor $(e_f, f_f)$, or the backward predictor $(e_b, f_b)$ or both, though averaged. The vector formed by the difference components between the position of the prevailing predictor and of MB2 (i,j) are defined as the motion vectors, and describe how MB2 (i,j) derives from a translation of a macroblock similar to it in the preceding and/or successive field.

SUMMARY OF THE INVENTION

An object of the present invention is to improve the efficiency of picture compression methods based on motion estimation algorithms by recognizing the presence of a picture sequence transformation referred to as of 3:2 pulldown.

From the above discussion, it is evident how the ability of recognizing the presence of a 3:2 pulldown may have a significant impact on the quality of the images, as well as on the efficiency of the compression process. It is essential to detect a 3:2 pulldown process in a continuous and simultaneous mode in relation to the other processes that take place in the coder.

There may be cases in which normal TV sequences are inserted into camera filmed sequences. For example, a TV broadcast film is regularly interrupted by commercials. Therefore, it is necessary to be able to immediately change from a film mode to a normal mode so that fields are not lost. Lost fields may cause an inevitable loss of information.

According to the present invention, the compression method of coding the digital data of a sequence of pictures comprises the steps of recognizing a 3:2 pulldown conversion of a certain number of film photograms in a sequence of a larger number of TV frames by duplicating some pictures and eliminating, as a consequence of the recognition, the redundancy due to such a picture duplication. The compression method is commonly based on a motion estimation procedure among successive pictures to remove the temporal redundancy of data.

The algorithm of the present invention is able to recognize the existence of repeated fields of a picture with respect to those of a preceding picture, and verifies that such repetitions are in a certain sequence. That is, the sequence corresponds to that of a 3:2 pulldown transformation. It is therefore a pre-requisite for the effectiveness of the method of the invention that the motion estimation algorithm implemented in the coder establish the motion between a frame and its successive frame in the sequence.

As already explained, the motion estimation algorithm searches, for each reference macroblock of the current picture, a predictor macroblock within a search window on a preceding frame or on a following frame relatively to the current frame. The best predictor is the one that minimizes a certain cost function (norm L1).

The algorithm for recognizing a 3:2 pulldown of the present invention exploits information made available by the system of motion estimation, the prevailing macroblock predictor and the cost function values. Since these data must be calculated during a coding phase, the determination of the 3:2 pulldown according to the method of the invention implies a relatively low impact on the overall complexity of the implementing hardware.

In a compression process the motion estimation between successive pictures of a sequence takes place by searching for each reference macroblock of a current picture a predictor macroblock within a search window on a picture temporally preceding or following the current one. By selecting the predictor that minimizes a certain cost function L1, the detection of a 3:2 pulldown in a flow of digital coding data of a sequence of pictures takes place through the following operations:

defining a reference macroblock of R*S pixels, half positioned on the top field and half positioned on the bottom field of a picture, each half including R*S/2 pixels;

searching for each macroblock of the current picture (i), with the exclusion of perimeter macroblocks, within the search window, and searching separately for the top half ($Top_i$) and bottom half ($Bottom_i$) for a macroblock of similar dimensions which would better predict (minimize the norm L1) with respect to the common half ($Top_{i-1}$, $Bottom_{i-1}$) on the temporarily preceding picture;

comparing the norm ($L1_{Top}$) associated to the prevailing predictor searched on the temporally preceding picture (i-1) with the norm ($L1_{Top0}$) obtained by using, as a predictor for the R*S/2 macroblock relative to the top half ($Top_i$) of the current picture, the macroblock R*S/2 in a common position on the preceding picture ($Top_{i-1}$), and incrementing a first counter (number_0_Top) if the latter norm ($L1_{Top0}$) is less than the first one ($L1_{Top}$);

carrying out the same operation of comparison between norms ($L1_{bottom}$, $L1_{bottom0}$) relative to the bottom halves, and incrementing a second counter (number_0_Bottom);

verifying if the number contained in the first and/or second counter is higher than a certain threshold (a*number of macroblocks, with a<1), and the occurrence of a repetition of one and/or the other half of the current picture with respect to the preceding one; and processing the data of acknowledgment or disacknowledgement of a repetition for a certain number of successive pictures for eventually detecting a coincidence with the repetition pattern of a 3:2 pulldown, thus confirming the detection of a 3:2 pulldown.

DETAILED DESCRIPTION OF THE PREFERRED EMBODIMENTS

Assume that the reference macroblock, whose dimensions are R*S pixel, is located half on the top field and half on the bottom field, and each half has R*S/2 dimensions. For each macroblock contained in the current frame, with the exception of those belonging to the outermost crown (first and last row, and first and last column), a macroblock of similar dimensions that best predicts (minimizes the L1 norm) is searched within the search window. The search is conducted separately on the Top i-1 for the R*S/2 part on Top i, and similarly on the Bottom i-1 for the R*S/2 part on Bottom i.

The norm L1 associated to the best predictor R*S/2 found on Top i-1 (indicated by $L1_{top}$) is compared with the value of the norm that would be obtained if, as a predictor for the R*S/2 macroblock on Top i, the R*S/2 macroblock in a common position on Top i-1 is used (indicated by $L1_{top0}$). If $L1_{top0}$ is less than $L1_{top}$, than it is possible that the macroblock R*S/2 on Top i did not shift in relation to the one on Top i-1. In this case, a first counter number_0_top is incremented.

A similar process is performed for the bottom field, obtaining $L1_{bottom0}$ and $L1_{bottom}$, comparing them and eventually incrementing a second counter, number_0_bottom. At the end of the scanning of the whole picture, the counter number_0_top contains the number of R*S/2 macroblocks which did not move between Top i−1 and Top i. If this number is higher than a times the total number of macroblocks contained in the picture, a being less than 1, it may be affirmed then that the Top field repeated itself. Similarly, if this condition is verified for the content of the counter number_0_bottom, then the Bottom field repeated itself.

These checks form a first test that may be conventionally defined as test1. To establish a further control test, the average values of $L1_{top0}$ and of $L1_{bottom0}$ for the whole picture are calculated. If the average of $L1_{bottom0}$ is greater by b times the average of $L1_{top0}$, b being greater than 1, then on average the macroblock R*S/2 on Top i is predicted better than the macroblock R*S/2 on Bottom i by the respective predictor in common positions on the fields if the picture is i−1. Therefore, it may be affirmed that the Top field has been duplicated, and vice-versa.

Figure 1:
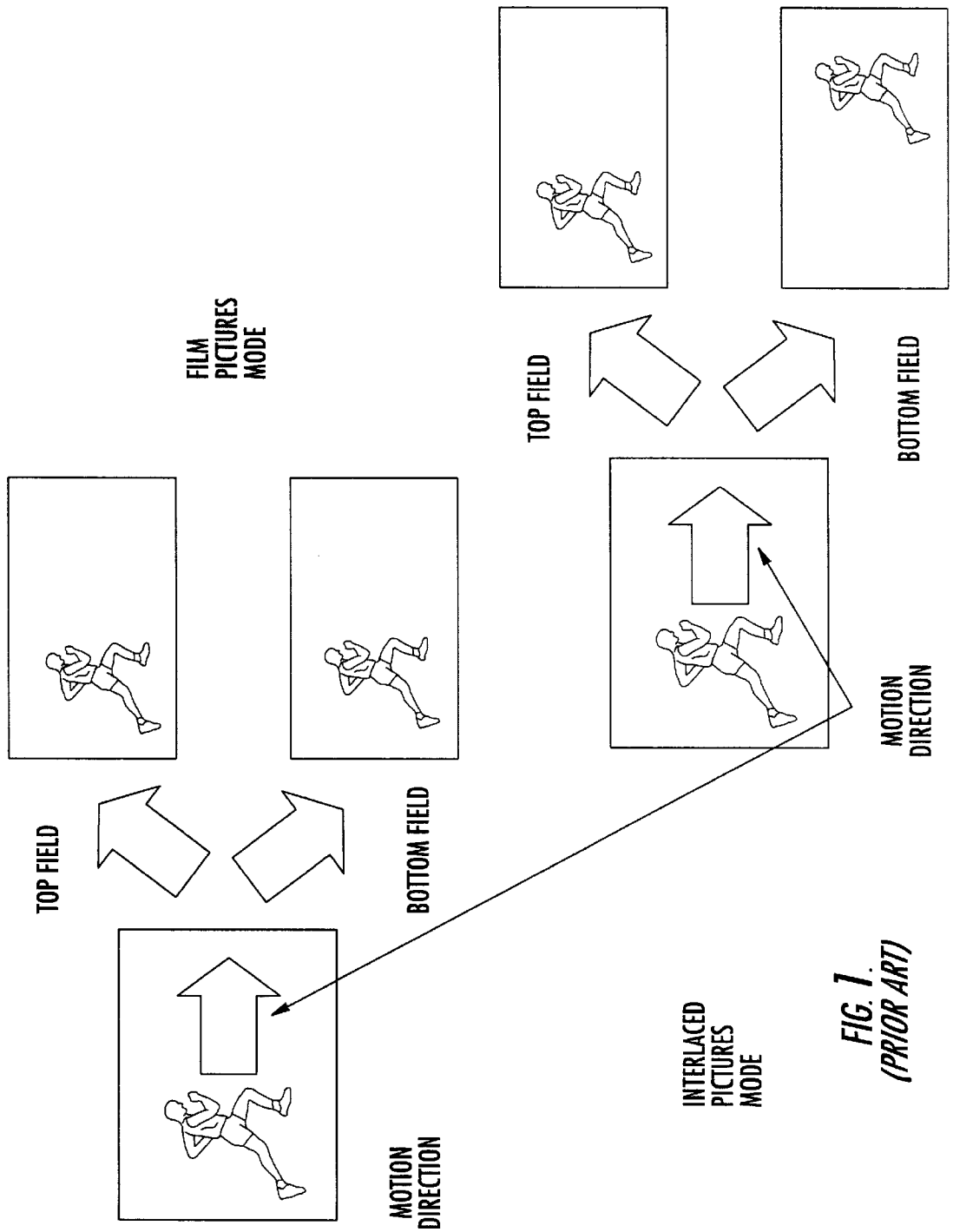
FIG. 1 shows an example of a progressive sequence (film) and of an interlaced sequence (TV), according to the prior art.
Figure 2:
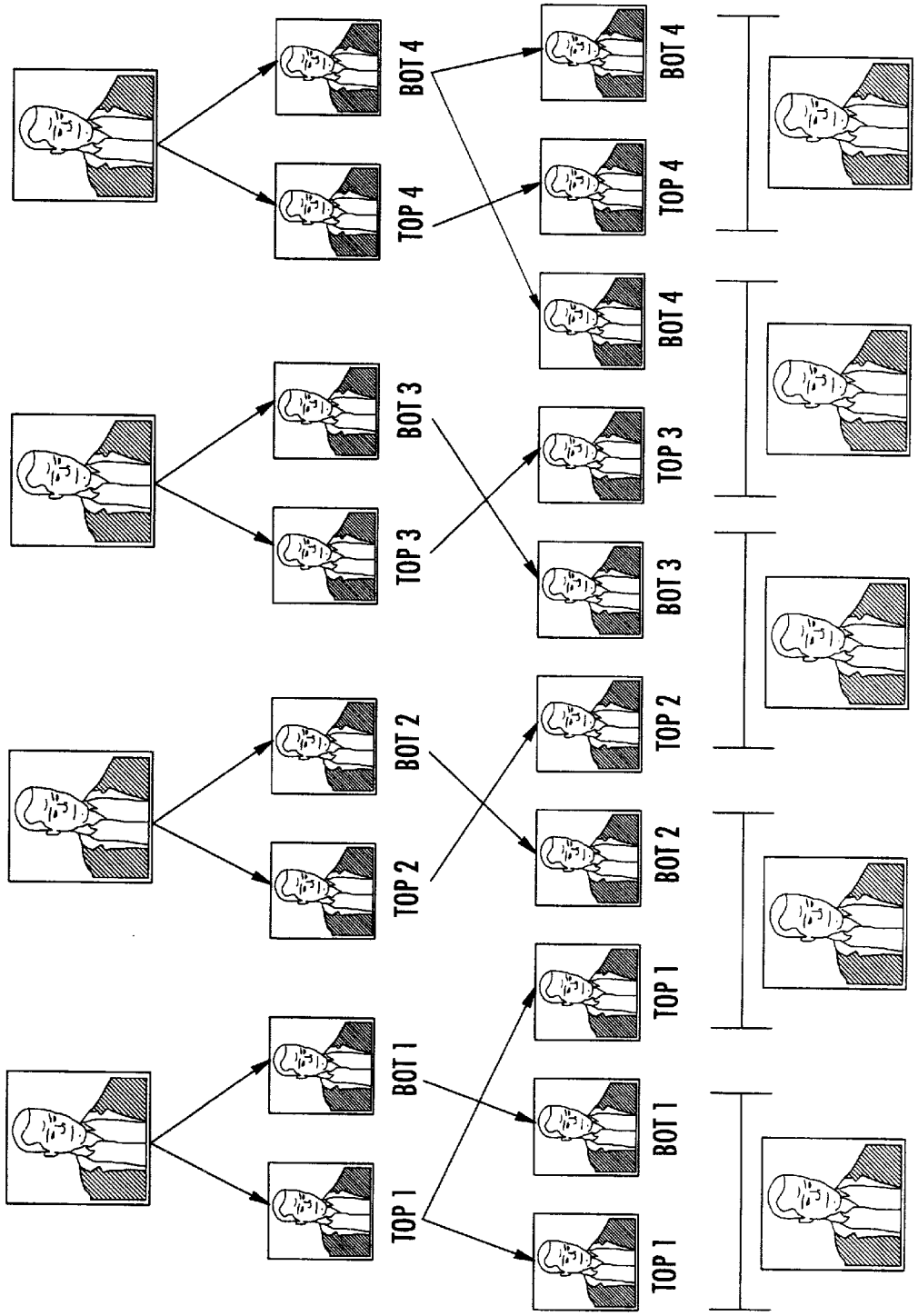
FIG. 2 shows the method referred to as a 3:2 pulldown for converting a series of four photograms of a film into a sequence of five TV frames, according to the prior art.
Figure 3:
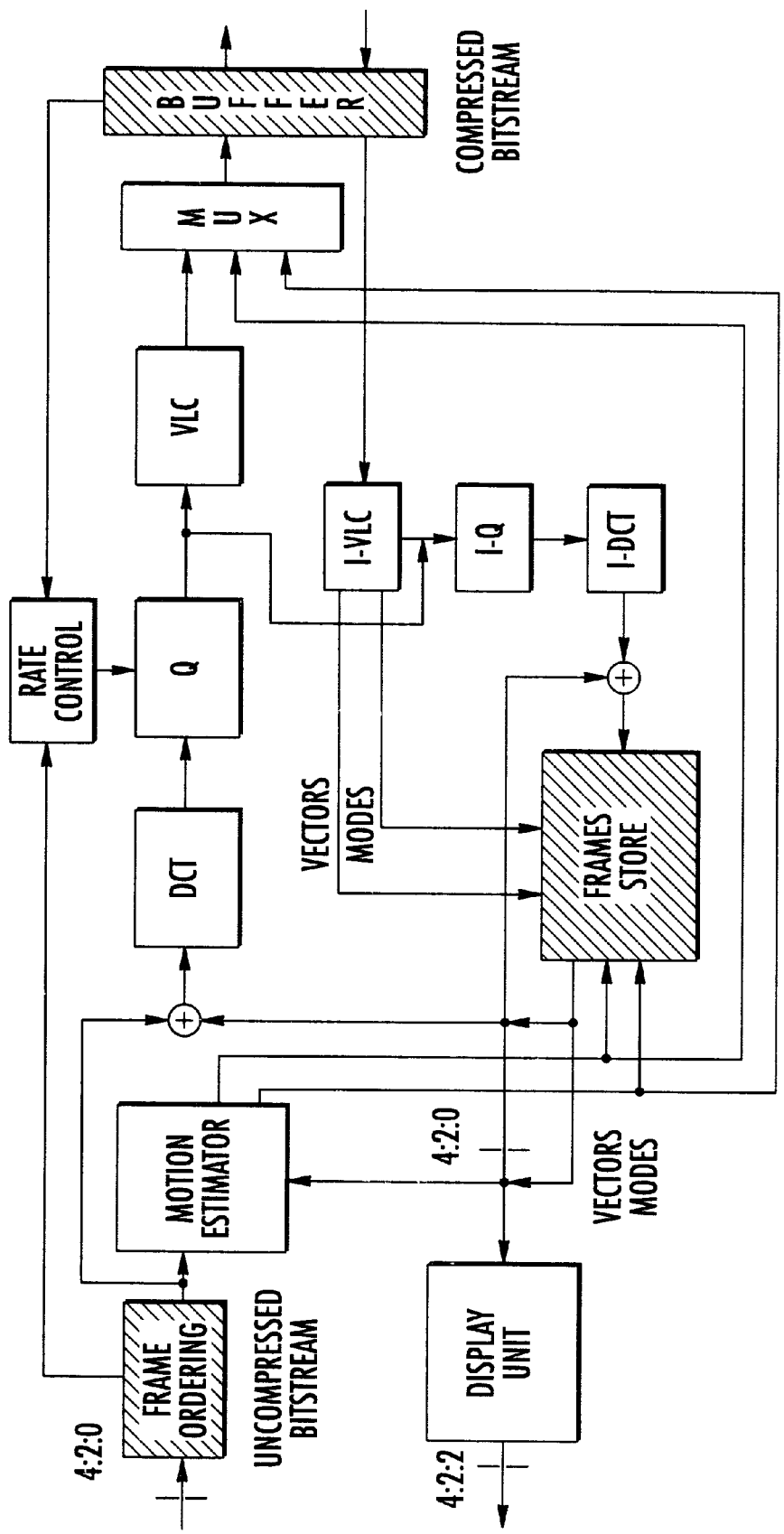
FIG. 3 is a diagram of a MPEG-2 MPML video coder including a motion estimator block within which the present invention is embodied.
Figure 4:
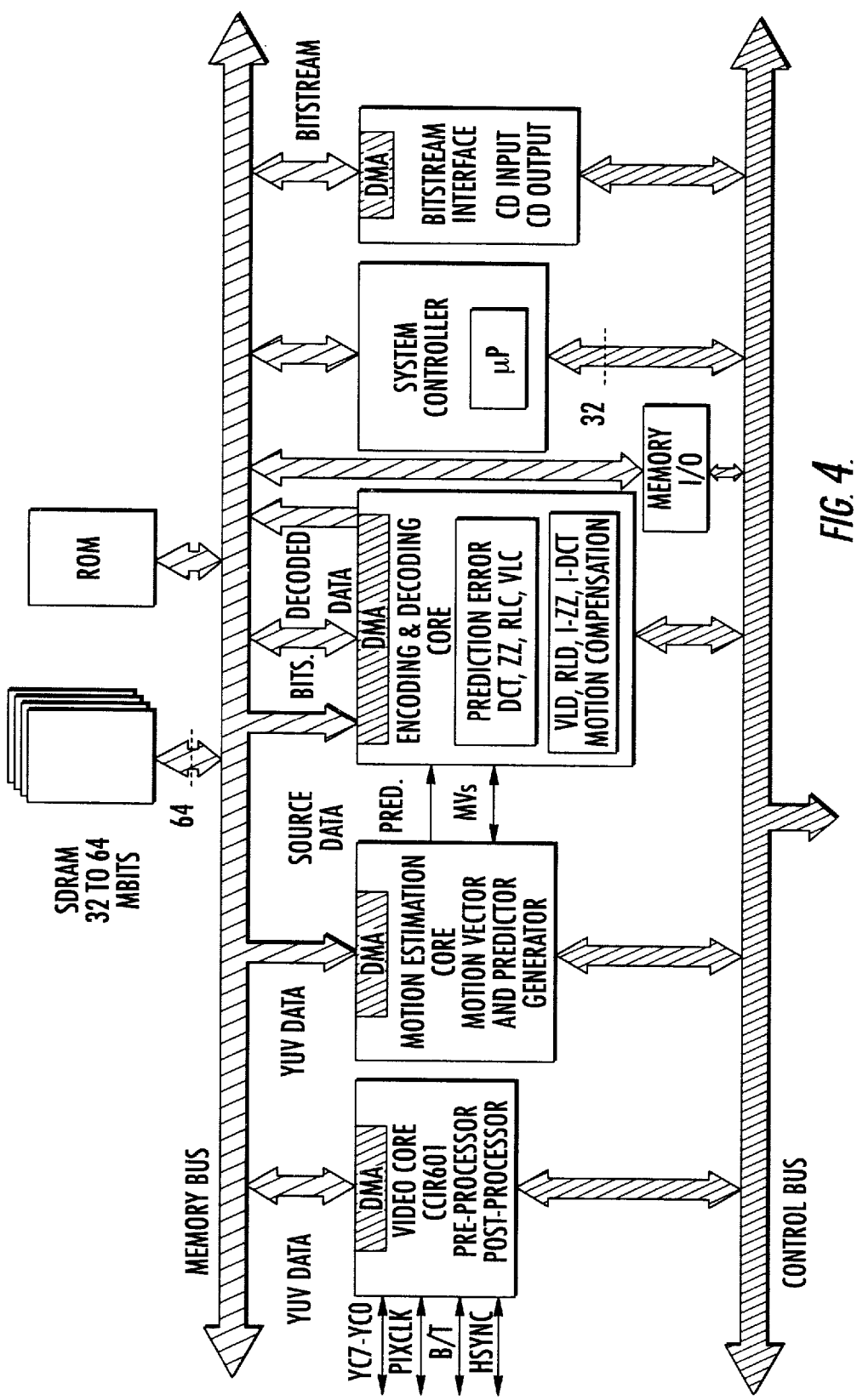
FIG. 4 is an architectural diagram of the MPEG-2 coder MPML of FIG. 3.
Figure 5:
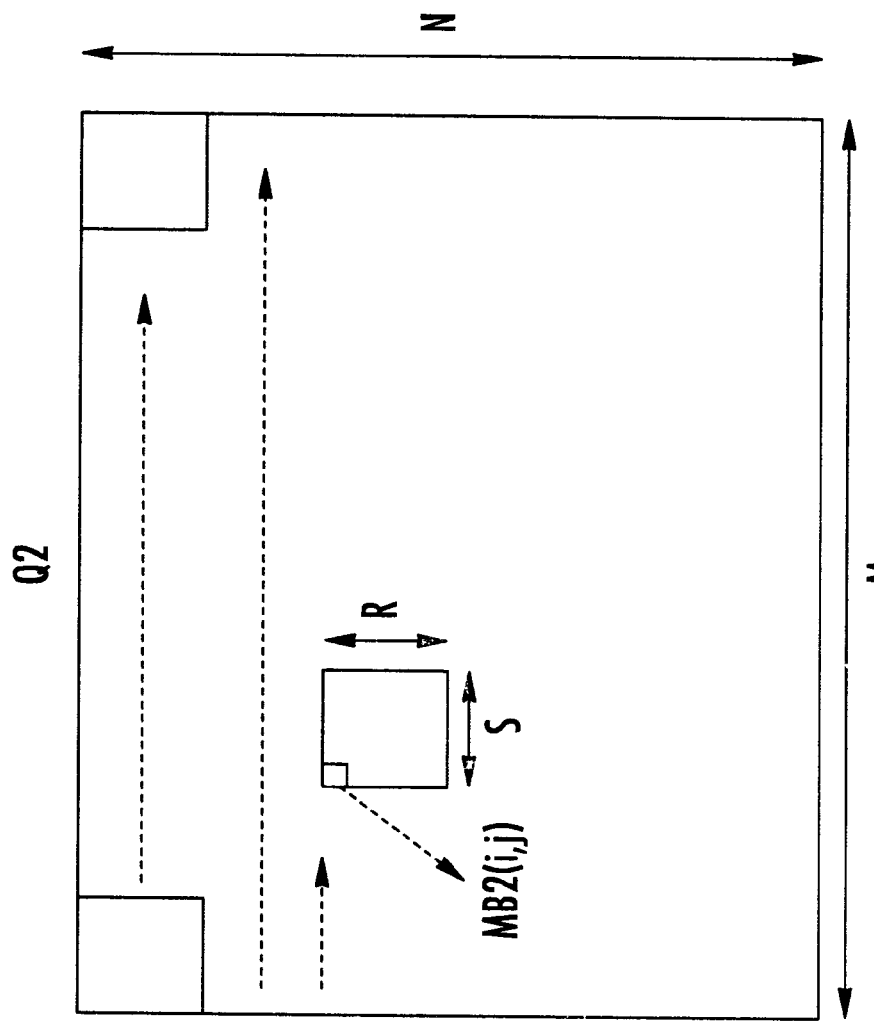
FIG. 5 shows the position of a macroblock on a certain picture in relation to its scanning order, according to the present invention.
Figure 6:
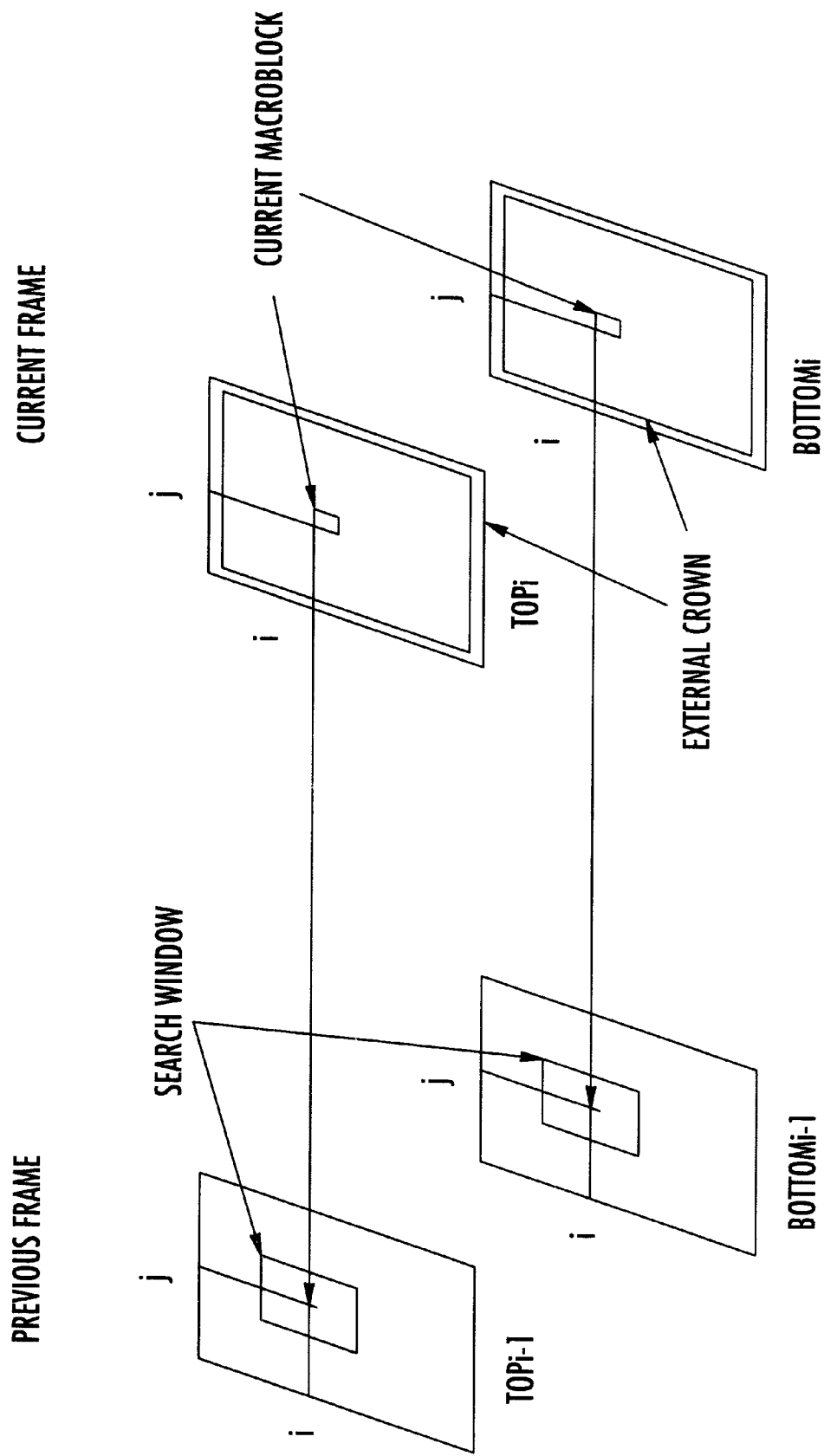
FIG. 6 depicts the search methodology among macroblocks of common fields: top vs. top and bottom vs. bottom, according to the present invention.
Figure 7:
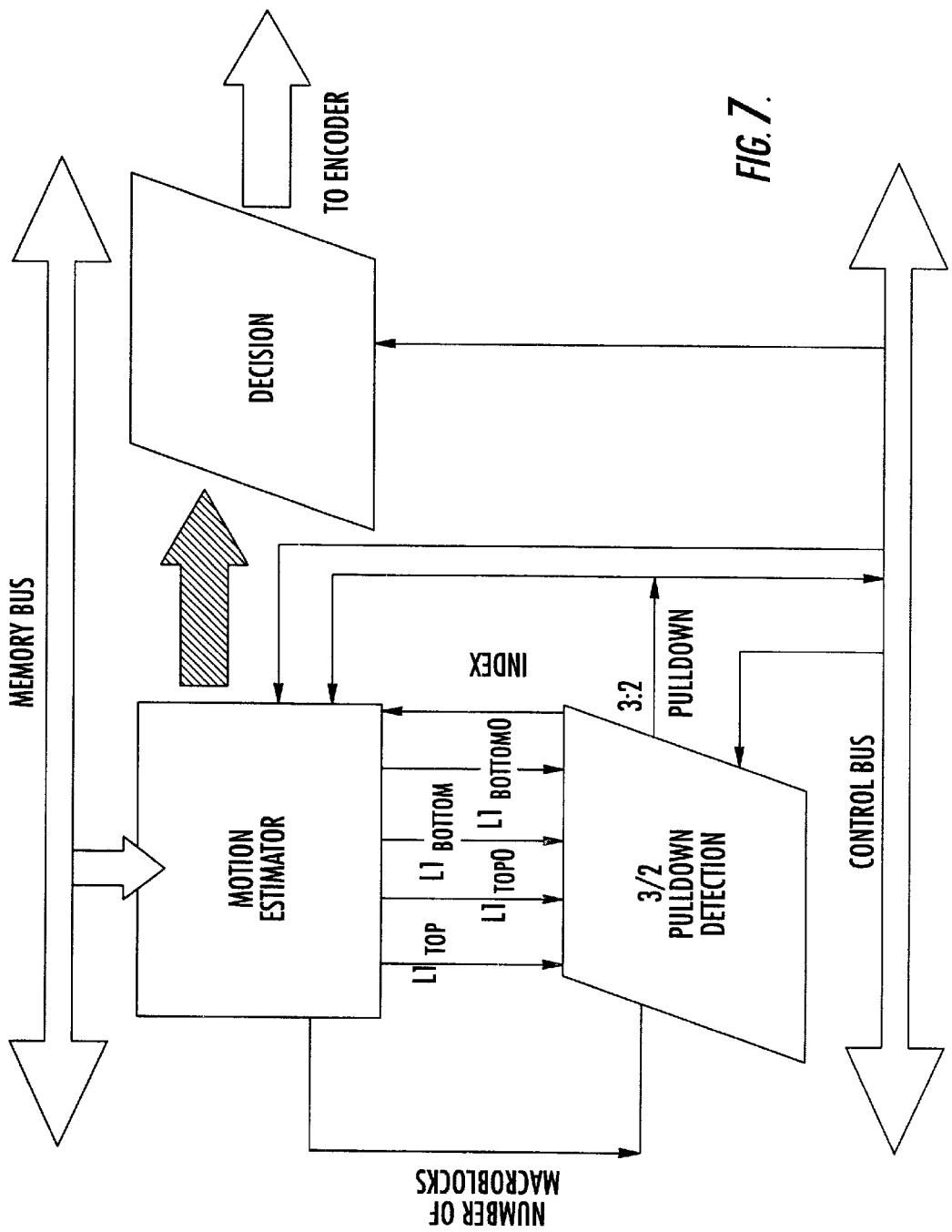
FIG. 7 is an architectural scheme of the Motion Estimator block, according to the present invention.
Figure 9:
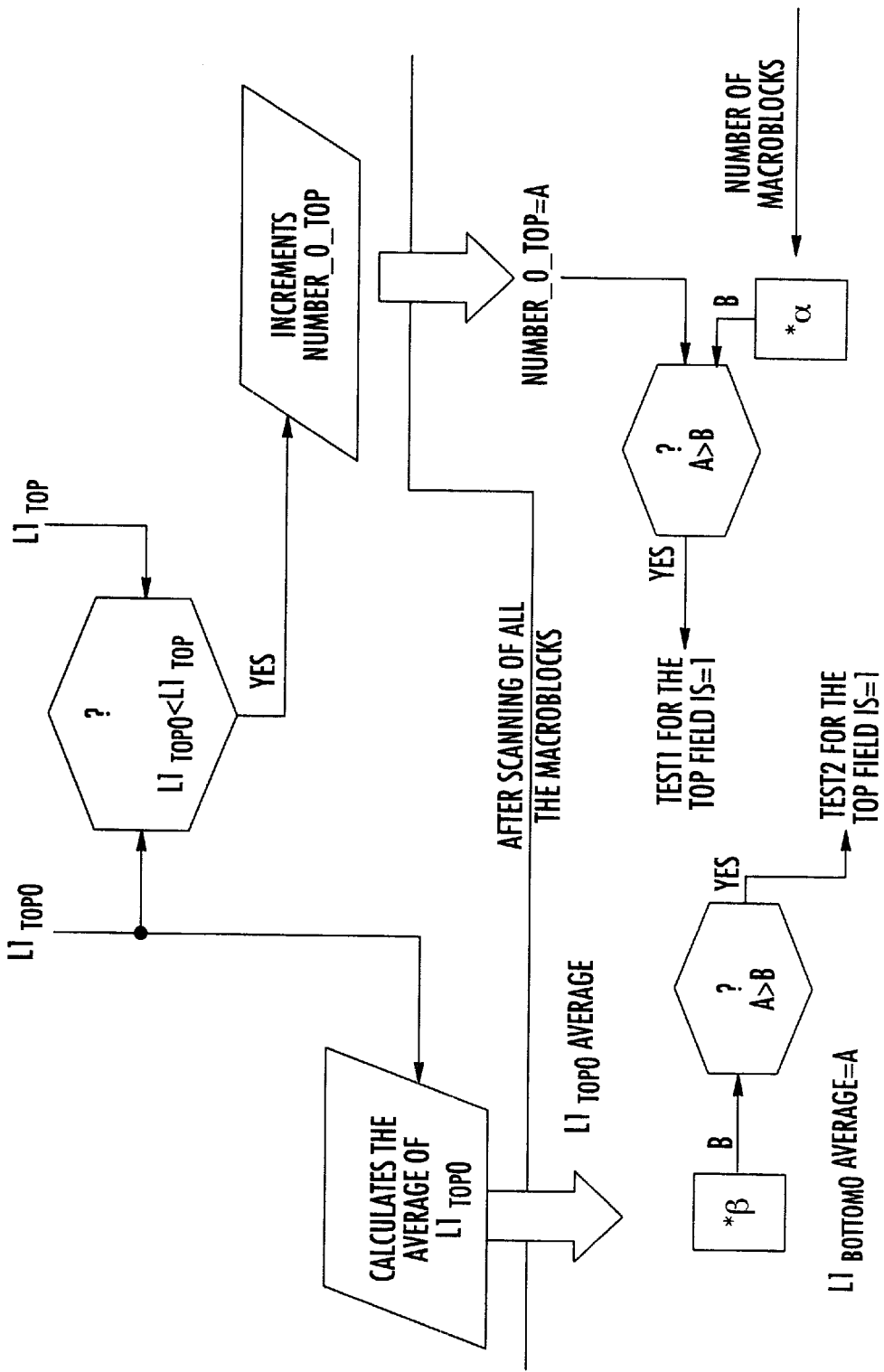
FIG. 9 illustrates the calculation scheme of Test1 and Test2 for the top field, according to the present invention.

Conventionally, this second test is referred to as test2. FIG. 7 shows the scheme of how the motion estimation block communicates with the block that detects the 3:2 pulldown. FIG. 9 shows the scheme of the test1 and test2 related to the top field. A similar scheme is used for testing the bottom field. Test1 for the top field and test1 for the bottom field are not mutually exclusive, so they may produce different values or even the same value contrary to test2.

Figure 8:
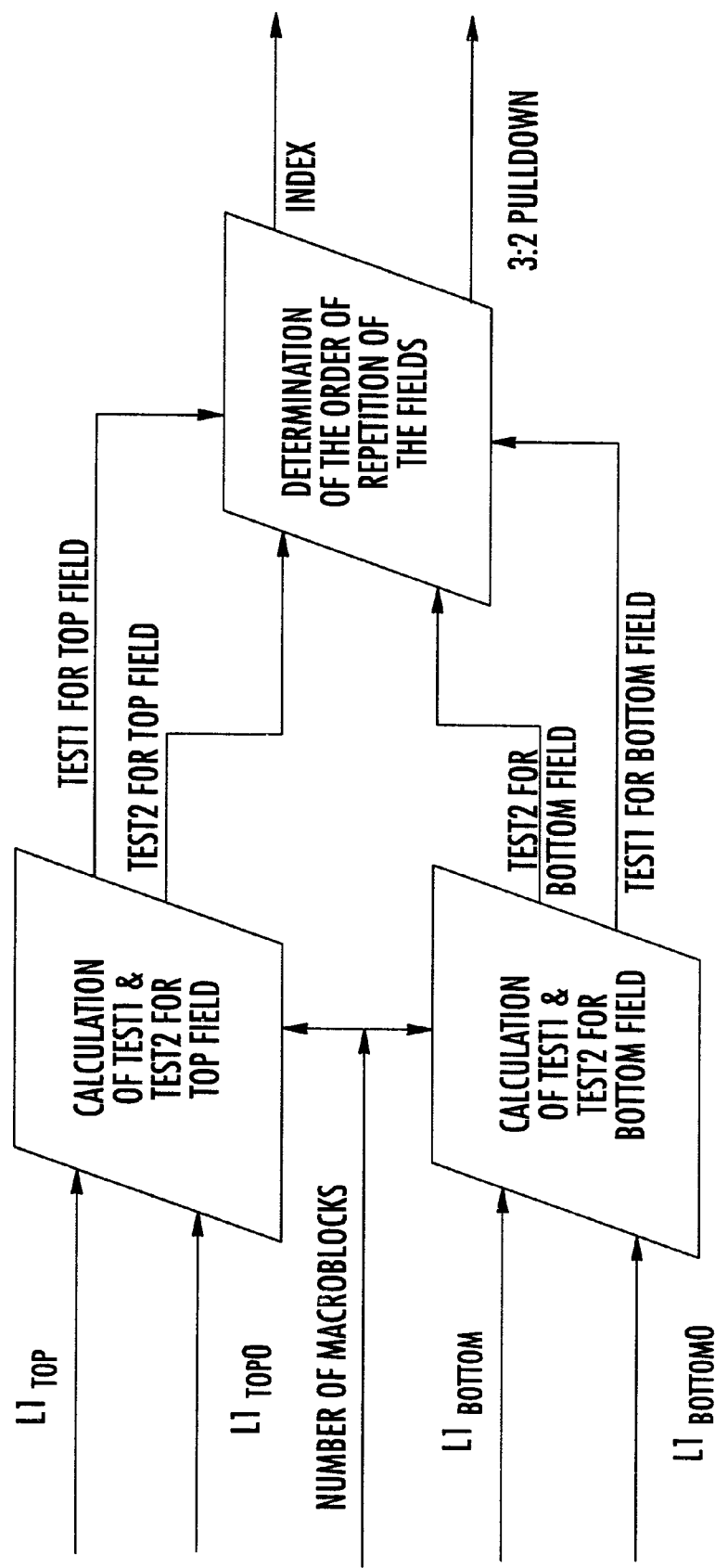
FIG. 8 is a block diagram of the 3:2 pulldown detection system, according to the present invention.

For a 3:2 pulldown, the duplicated fields must fit a well defined scheme or pattern. Therefore, as shown in FIG. 8, the block that detects the 3:2 pulldown includes three functional subblocks. The first two subblocks calculate test1 and test2 for the Top and for the Bottom field, respectively, and the third subblock controls whether the fields are repeated in the right order or not. Therefore, a table may be generated for showing the pattern of repetition of the fields, and which at any instant, indicates the position of the current picture within such a scheme.

| Repeated Top | Repeated Bottom | Index |
|---|---|---|
| 1 | 0 | 0 |
| 0 | 0 | 1 |
| 0 | 0 | 2 |
| 0 | 1 | 3 |
| 0 | 0 | 4 |
| 0 | 0 | 4 | where:
index indicates the position of the current frame within the mask;
1 indicates in the specific frame there may be a duplication of that particular field with respect to the preceding frame; and
0 indicates that there should not be any duplication of that particular field.

Figure 10:
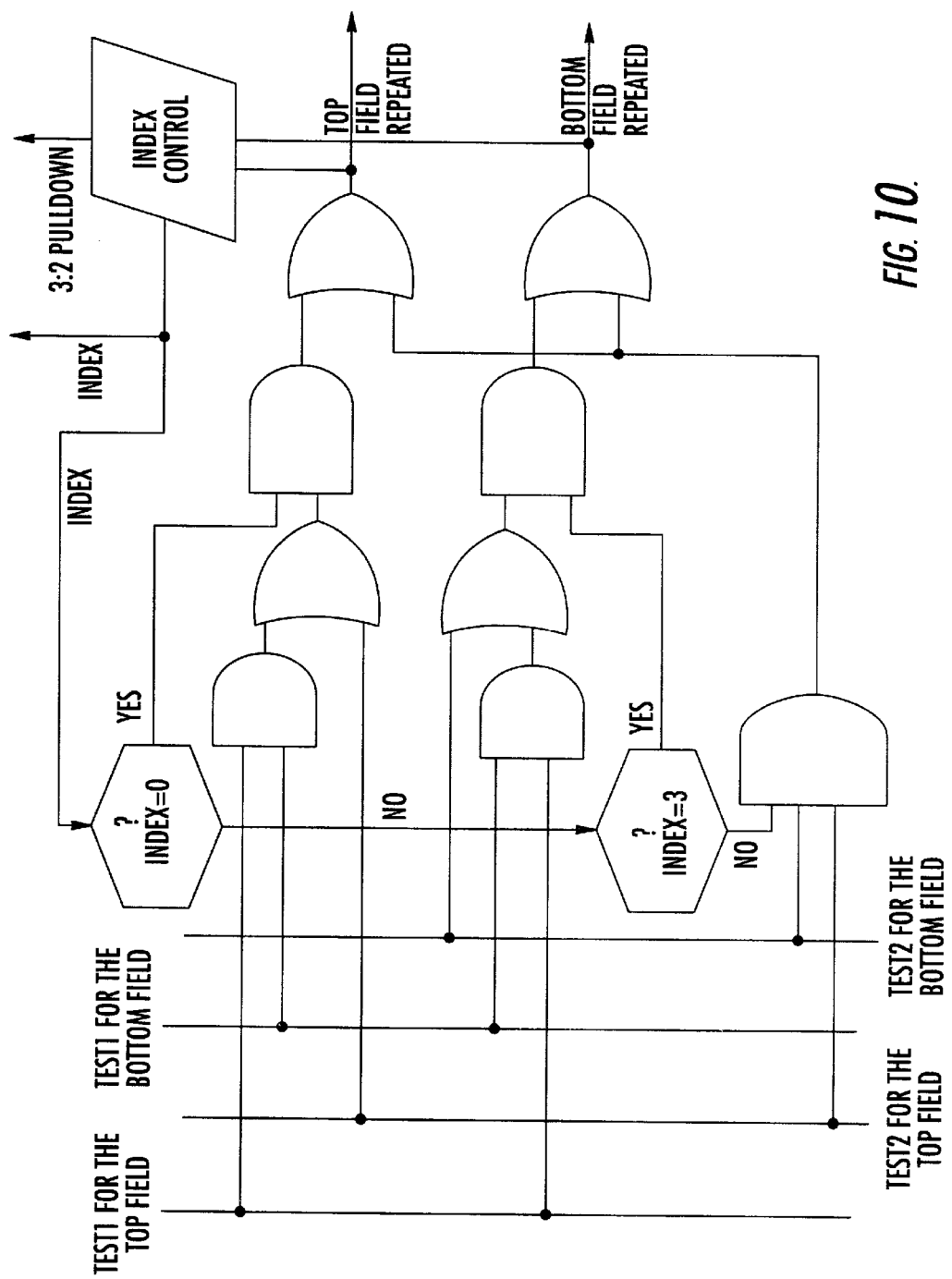
FIG. 10 illustrates the scheme for determining the presence of repeated fields and for checking the order of repetition, according to the present invention.

The method for determining the presence of duplicated fields may be implemented according to the architectural scheme shown in FIG. 10. The process is the following:
a) index=0?
yes{[(test1 for the top) and (no test1 for the bottom)] or (test2 for the top)}?
yes then the top field is duplicated.

b) index=3?
yes{[(test1 for the bottom) and (no test1 for the top)] or (test2 for the bottom)}?
yes then the bottom field is duplicated.
c) index different from 0 and from 3?
yes[(test2 for the top) and (test2 for the bottom)]?
yes then both the top and bottom field are duplicated.

Depending on the position occupied by the picture in the mask (index), a possible repetition of the field that should be duplicated according to a 3:2 pulldown is searched. Therefore, when the index is equal to 0, a repeated top is searched. When the index is equal to 3, a repeated bottom is searched. In all the other cases, both the top and bottom fields are checked to see that they are not repeated.

The Control Index block of FIG. 10 controls whether the fields are duplicated in the right order according to the following procedure. Starting from the condition where the 3:2 pulldown is not detected, the index is zero and continues to be so, frame after frame, until a duplication of the top field and a nonduplication of the bottom field are determined (as per scheme). At this point the index is incremented and, therefore, in the successive frame the duplication of the fields as per the table for index equal to 1 (no repetition) is searched.

If the repetition is the wrong one, the index returns to zero and the procedure start over. On the contrary, if the repetition of the fields is the right one, the index is incremented and so forth. The 3:2 pulldown is detected upon completion of a mask. The index returns to zero and so forth. From the detection of a 3:2 pulldown, the encoder remains in a film mode until a different field duplication pattern from that of the table for a corresponding index value is encountered. When this occurs, the index returns to zero, the encoder ceases to operate in a film mode and the procedure starts again from the beginning.

That which is claimed is:
1. A method for compressing encoding data of a sequence of pictures based on a motion estimation among successive images to remove temporal redundancy from the data being encoded, the method comprising:
detecting a 3:2 pulldown conversion of a series of photograms of a filmed sequence in a sequence of TV frames having a number greater than a number of the photograms by duplication of certain pictures in a certain order, a full field of each frame being divided into a plurality of macroblocks;
detecting a field duplication by counting the number of macroblocks remaining fixed or undergoing a negligible shift between two consecutive fields, and comparing the count with a threshold for determining if the field is being duplicated; and
eliminating the temporal redundancy due to the detected field duplications.
2. A method according to claim 1, wherein the motion estimation among successive pictures of the sequence operates for each reference macroblock of a current picture a search of a predictor macroblock within a search window on a temporally preceding or following picture, and a selection of the predictor which minimizes predetermined certain cost functions.
3. A method according to claim 2, wherein detecting a 3:2 pulldown comprises:
a) defining a reference macroblock of R*S pixels positioned half on a top field and half on a bottom field of a picture, each half having R*S/2 pixels;
b) searching for each macroblock of a current picture, with the exception of perimeter macroblocks, within the search window and separately for the top half and for the bottom half a macroblock of similar dimensions that best predicts an L1 norm with respect to a common half on the temporally preceding picture;

c) comparing the norm associated to a best predictor searched on the temporally preceding picture relative to the top half, with the norm obtained using as a predictor for a macroblock R*S/2 relative to the top half of the current image a macroblock R*S/2 in a common position on the preceding picture, and incrementing a first counter if the latter norm value is less than the first norm value;

d) repeating step c) for comparing among norm values also for the bottom half incrementing a second counter;

e) verifying if a number contained in the first and the second counters is greater than a certain threshold affirming occurrence of a repetition of one of the half fields of the current picture with respect to the preceding picture; and f) processing data of a repetition for a number of successive pictures recognizing a coincidence with the pattern of a 3:2 pulldown affirming the detection of a 3:2 pulldown.

4. A method according to claim 3, further comprising:

calculating and processing an average value of the norm values relative to the top field and to the bottom field for the whole current picture;

verifying whether the average value relative to the bottom field is b times higher than the average value of the norm relative to the top field, b being greater than 1, for establishing that the top field of the current picture is better predicted than the bottom field by the predictor macroblock in a common position on a same field of the preceding temporal picture so that it is the top field to have been duplicated, and for establishing that the top field of the current picture is better predicted than the bottom field by the predictor macroblock in the common position on the same field of the preceding temporal picture so that it is the bottom field to have been duplicated; and processing a result of the verifying performed on averaged norm values together with the data produced for recognizing an eventual coincidence with the 3:2 pulldown pattern and affirming the detection of the same.

5. A method according to claim 3, wherein the motion estimation is applicable to an SPML compressed video sequence of a PAL type.

6. A method according to claim 3, wherein the motion estimation is applicable to an SPML compressed video sequence of a NTSC type.

7. An MPEG2 encoder comprising:

a motion estimator among successive frames to remove temporal redundancy from data to be compressed;

detection means for recognizing a 3:2 pulldown of conversion of a series of a certain number of photograms of a filmed sequence in a sequence of TV frames having a number greater than a number of the photograms by duplication of certain pictures in a certain order, a full field of each frame being divided into a plurality of macroblocks;

counter means for detecting a field duplication by counting the number of macroblocks remaining fixed or undergoing a negligible shift between two consecutive fields;

comparing means for comparing the count with a threshold for determining if the field is being duplicated; and elimination means for eliminating the redundancy due to the detected field duplications.

8. An MPEG2 encoder according to claim 7, wherein said detection means comprises:

a) a first unit for defining a reference macroblock of R*S pixels positioned half on a top field and half on a bottom field of a picture, each half having R*S/2 pixels;

b) a second unit for searching for each macroblock of a current picture, with the exception of perimeter macroblocks, within a search window and separately for the top half and for the bottom half a macroblock of similar dimensions that best predicts an L1 norm with respect to a common half on the temporally preceding picture;

c) a third unit for comparing the norm associated to the best predictor searched on the temporally preceding picture relative to the top half, with the norm obtained using as a predictor for a macroblock R*S/2 relative to the top half of the current image a macroblock R*S/2 in a common position on the preceding picture, and incrementing a first counter if the latter norm value is less than the first norm value;

d) a fourth unit for comparing the norm associated to a best predictor searched on the temporally preceding picture relative to the bottom half, with the norm obtained using as a predictor for the macroblock R*S/2 relative to the bottom half of the current image the macroblock R*S/2 in a common position on the preceding picture, and incrementing a second counter if the latter norm value is less than the first norm value;

e) a fifth unit for verifying if a number contained in the first and the second counters are greater than a certain threshold affirming the occurrence of a repetition of one of the half fields of the current picture with respect to the preceding picture; and f) a sixth unit for processing data of a repetition for a number of successive pictures recognizing a coincidence with the pattern of a 3:2 pulldown affirming the detection of a 3:2 pulldown.

9. An MPEG2 encoder according to claim 8, further comprising:

a first processor for calculating and processing an average value of the norm values relative to the top field and to the bottom field for the whole current picture;

a verification circuit for verifying whether the average value relative to the bottom field is b times higher than the average value of the norm relative to the top field, b being greater than 1, for establishing that the top field of the current picture is better predicted than the bottom field by the predictor macroblock in a common position on a same field of the preceding temporal picture so that it is the top field to have been duplicated, and for establishing that the top field of the current picture is better predicted than the bottom field by the predictor macroblock in the common position on the same field of the preceding temporal picture so that it is the bottom field to have been duplicated; and a second processor for processing a result of the step of verifying performed on averaged norm values together with the data produced for recognizing an eventual coincidence with the 3:2 pulldown pattern and affirming the detection of the same.

10. An MPEG2 encoder according to claim 7, wherein the motion estimation is applicable to an SPML compressed video sequence of a PAL type.

11. An MPEG2 encoder according to claim 7, wherein the motion estimation is applicable to an SPML compressed video sequence of a NTSC type.

* * * * *

UNITED STATES PATENT AND TRADEMARK OFFICE
CERTIFICATE OF CORRECTION

PATENT NO. : 6,549,668 B1
DATED : April 15, 2003
INVENTOR(S) : Luca Pezzoni, Emiliano Piccinelli and Danilo Pau It is certified that error appears in the above-identified patent and that said Letters Patent is hereby corrected as shown below:

Column 4,
Line 44, delete "and or" insert -- and/or --

Column 5,
Line 15, delete "Q1" insert -- Q2 --
Line 52, delete "$QP_{-1}$" insert -- $QP_{n-2}$ --

Column 6,
Line 18, delete "precede" insert -- precedes --
Line 57, delete "of" insert -- a --

Column 7,
Line 27, delete "relatively" insert -- relative --

Signed and Sealed this

Twenty-sixth Day of August, 2003

JAMES E. ROGAN
*Director of the United States Patent and Trademark Office*